United States Patent
Chang

(10) Patent No.: US 7,102,971 B2
(45) Date of Patent: Sep. 5, 2006

(54) METHOD FOR REDUCING THE NUMBER OF READ AND WRITE OPERATIONS DURING MT. RAINIER DEFECT PROCESSING

(75) Inventor: Kuo-Chiang Chang, Taipei (TW)

(73) Assignee: Lite-On It Corp., (TW)

( * ) Notice: Subject to any disclaimer, the term of this patent is extended or adjusted under 35 U.S.C. 154(b) by 566 days.

(21) Appl. No.: 10/631,198

(22) Filed: Jul. 31, 2003

(65) Prior Publication Data
US 2004/0037124 A1    Feb. 26, 2004

(30) Foreign Application Priority Data
Aug. 20, 2002    (TW) ................ 91118851 A

(51) Int. Cl.
*G11B 7/00* (2006.01)
(52) U.S. Cl. .................. 369/53.15
(58) Field of Classification Search ........... 369/53.12, 369/53.13, 53.15, 53.17, 275.3; 714/48, 714/51, 6
See application file for complete search history.

(56) References Cited

U.S. PATENT DOCUMENTS 6,845,075 B1 *    1/2005    Imai et al. ............ 369/59.22

* cited by examiner

*Primary Examiner*—Nabil Hindi
(74) *Attorney, Agent, or Firm*—Raymond Sun

(57) ABSTRACT

A method for reducing the number of operations performed on a recording disk during Mt. Rainier defect processing is disclosed. According to this method, data is written from a host to a recording disk. If there are defects in the section where data is to be written, a replacement block for the currently-processed defective block is searched for. If there is previous replaced data currently stored in the replacement packet buffer (RPB), and if the packet in the RPB is the same as the packet for the replacement block, then the method only copies the data in the currently-processed defective block into the corresponding replacement block in the RPB without any reading operations. In addition, after completion of the read and copy operations, no immediate write to the recording disk is performed, thereby saving time.

6 Claims, 3 Drawing Sheets

METHOD FOR REDUCING THE NUMBER OF READ AND WRITE OPERATIONS DURING MT. RAINIER DEFECT PROCESSING

BACKGROUND OF THE INVENTION

1. Field of the Invention

The present invention relates to a method for reducing the number of read and write operations performed on a recording disk during Mt. Rainier defect processing.

2. Description of the Prior Art

Mt. Rainier is an industry standard, proposed by Microsoft, Compaq, Philips, Sony and others, that regulates the data storage format of new recording disks. Hereafter the new recording disks are called CD-MRW for short. First, it is well-known that a optical disk drive can only write complete packets. Each packet includes one link block, four "run-in" blocks ($R_{in}$), 32 user data blocks, and two "run-out" blocks ($R_{out}$). The link block indicates whether the laser in the optical disk drive (which is used for the writing operation) is on or off. Typically, the start and the end of each packet contain a half block, for a total of one block. The $R_{in}$ blocks can be considered to be "waiting" blocks, to address the situation where the servo system is not completely ready even when the laser is turned on (i.e., starting the write operation). The $R_{out}$ blocks are similar in function to the $R_{in}$ blocks.

FIG. 3 illustrates how the storage space on a conventional recording disk is organized. Each data block DA is intended to store data (i.e., data is to be written to each data area), and each data block DA is followed by an adjacent spare block SA that is used to store the data intended for its adjacent data block DA if that data block DA contains a defect. If the adjacent spare block SA is full, the defective block data will be written to other spare blocks SA.

In addition, each CD-MRW has a main table area (MTA). Defect tables are contained in a maximum of eight packets in the main table area. FIG. 4 illustrates a typical layout of a defect table block (DTB). The "Reallocation Entries" identify a defective block to which a replacement block has been assigned. The "Free Entries" identify a replacement block that has not yet been assigned to a defective block. The "Unusable Entries" identify a replacement block that cannot be used (e.g., the replacement block itself is defective). When a recording disk is formatted, defect table entries are recorded on to the disk. Each defect table entry consists of six bytes. The first three bytes indicate a defective block and the last three bytes indicate the corresponding replacement block that has been assigned for the defective block.

FIG. 1 is a flow chart illustrating a conventional Mt. Rainier method of writing data to a recording disk which has defects. Before the write operation begins, the defect tables on the disk are checked. When writing data to a defective block, the optical disk drive will write to the replacement block instead based on the physical block numbers contained in the defect tables.

In Step 10a, the write operation begins. In Step 11a, a write command is issued by the host; that is, the host issues the write command to the CD-RW unit, directing the optical disk drive to receive data that comes from the host and to write the received data to the recording disk.

In Step 12a, it is determined whether all the data from the host has been written. If all the data has been written, processing then proceeds to Step 13a where the write operation concludes. If all the data has not been completely written, then processing proceeds to Step 14a.

In Step 14a, it is determined whether any defects are detected in a given section where data is to be written. If there is a defect in this section, then read, modify and write operations are performed for each of the defects. In other words, for the first defect, the block that is to be replaced is searched for in Step 141a, and then in Step 142a the entire packet where the replacement block is located is read from the recording disk into the replacement packet buffer (RPB), which is in the RAM of the optical disk drive. The RPB usually has a size of one packet. Next, in Step 143a, the data in the defective block is copied from the main buffer (which is also in the RAM of the optical disk drive) into the corresponding replacement block in the RPB. Then, in Step 144a, the modified data in the RPB is written to the corresponding spare block SA in the recording disk, after which processing proceeds to Step 15a.

In Step 15a, it is determined whether there are more defects in the section where data is to be written. If there are other defects, then processing returns to Step 141a and the read, modify and write operations are repeated in Steps 141a–144a, until all the defects for the section have been processed. If there are no other defects in the section, processing then returns to Step 12a.

Returning to Step 14a, if there are no defects in the section where data is to be written into, processing then proceeds to Step 145a where the contents of the main buffer are written directly to the recording disk. Processing then proceeds to Step 16a.

In Step 16a, it is again determined whether there are new defects detected during the write operation. In this step, if no new defects are detected, processing then returns to Step 12a. However, new defects may occur on a recording disk even after it has been formatted (such as from scratches during use by the user). If any such new defects are detected, then processing proceeds to steps 161a–165a where free replacement blocks are searched for in the defect table for use as new replacement blocks. Here, "free replacement blocks" mean those blocks that have not been written into, and which are available to receive data.

At this point, the writing operation is terminated in step 161a so that free replacement blocks can be searched for. Then, in step 162a, free defect table entries (i.e., free replacement blocks) are searched for use as replacement data. After the search of the defect table is completed, processing proceeds to Step 163a.

In step 163a, the entire packet where the replacement block is located is read from the RAM of the optical disk drive into the replacement packet buffer (RPB), which is in the RAM of the optical disk drive. Next, in Step 164a, the data of the defective block is copied from the main buffer into the corresponding replacement block in the RPB. Then, in Step 165a, the modified data in the RPB is written to the corresponding spare block SA in the recording disk, after which processing proceeds to Step 17a.

In Step 17a, it is determined whether there are more defects. If new defects are detected, processing then returns to Step 162a and the read, modify and write operations are repeated in Steps 162a–165a, until processing of all the defects has been completed. If no new defects are detected, processing then returns directly to Step 12a. Thus, the read, modify and write operations in Steps 142a–144a are similar to those in Steps 163a–165a.

As can be seen from the above, in this conventional method, replacement packets are read from the recording disk, the defective block data are copied, and then all the packet data are written to the recording disk. Thus, regardless of whether the defect encountered by the optical disk drive already exists in the defect table block (DTB) or is a new defect detected during the process of writing to the recording disk, the optical disk drive must still perform the read-modify-write operation for each and every defect. As a result, if N defects are detected in the recording disk, then the optical disk drive must perform N read and N write operations, resulting in a low efficiency in the buffer control. This will also seriously affect the read and write speed of the optical disk drive.

SUMMARY OF THE DISCLOSURE

It is an objective of the present invention to provide a method for reducing the number of read and write operations performed on a recording disk during Mt. Rainier defect processing.

It is another objective of the present invention to provide a buffer control system that can be used to reduce the number of read and write operations performed on a recording disk during Mt. Rainier defect processing.

In order to accomplish the objects of the present invention, the present invention provides a method for reducing the number of read and write operations performed on a recording disk during Mt. Rainier defect processing. According to this method, data is written from a host to a recording disk. If there are defects in the section where data is to be written, a replacement block for the currently-processed defective block is searched for. If there is previous replaced data currently stored in the replacement packet buffer (RPB), and if the packet in the RPB is the same as the packet for the replacement block, then the method only copies the data in the currently-processed defective block into the corresponding replacement block in the RPB without any reading operations. In other words, during processing of the next defective block, no current read operation is needed because the replacement block of the defect has already been read into the RPB during the previous process. Only when there is no replacement block in the RPB will it become necessary to write the contents of the RPB back on to the recording disk and to read the new replacement block packet into the RPB. In addition, after completion of the read and copy operations, no immediate write to the recording disk is performed, thereby saving time.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The method utilized by the present invention is based on the concept of cache hit in RPB. If the corresponding replacement block of a defective block that is being processed already exists in the RPB, it becomes unnecessary to read from the recording disk to the RPB, and the copy operation can be carried out immediately. After the copy operation is finished, it is also unnecessary to write to the recording disk at once. As a result, read and write operations can be reduced.

Figure 1:
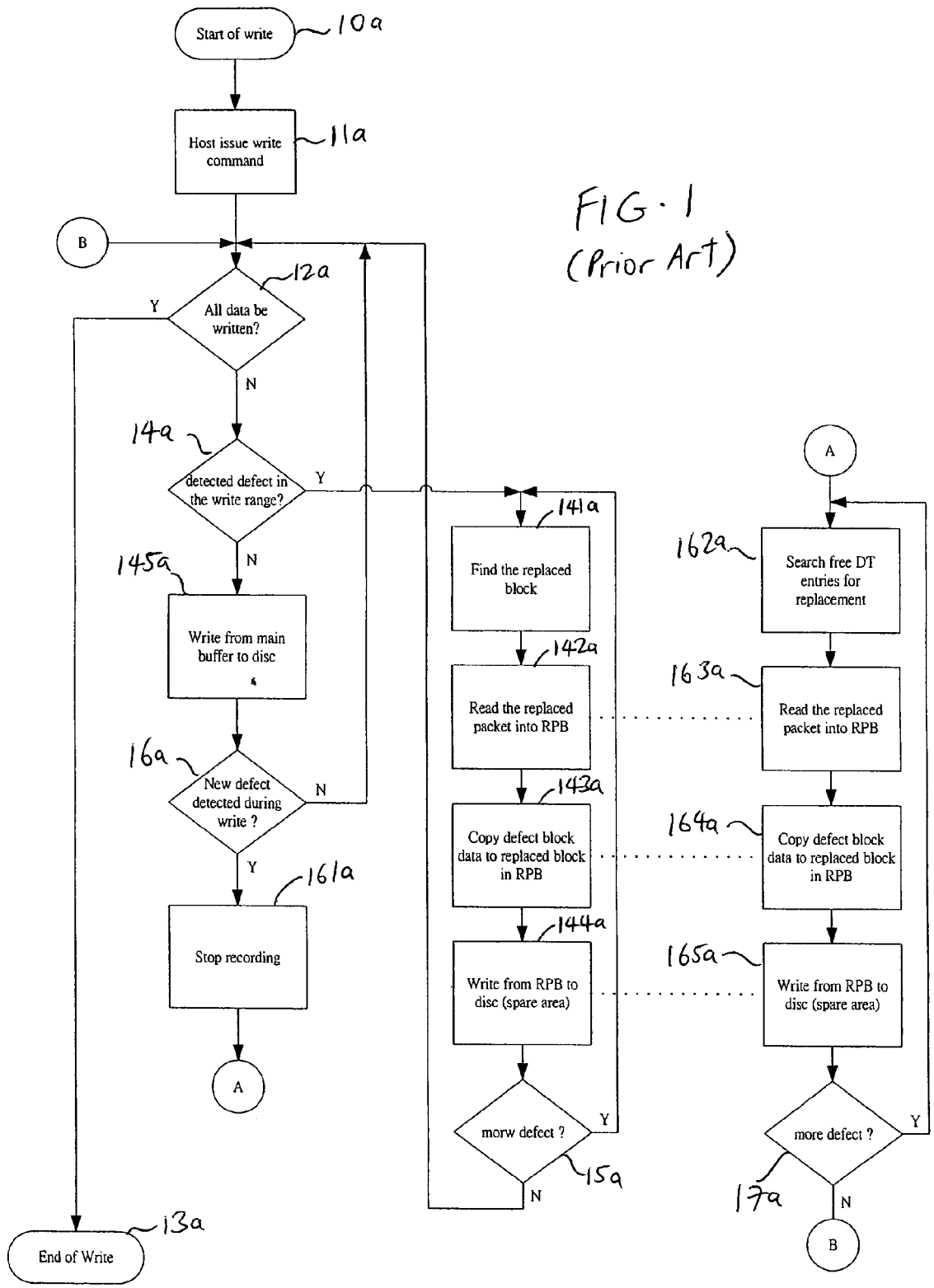
FIG. 1 is a flow chart illustrating a conventional Mt. Rainier method of writing data to a recording disk which has defects.
Figure 2:
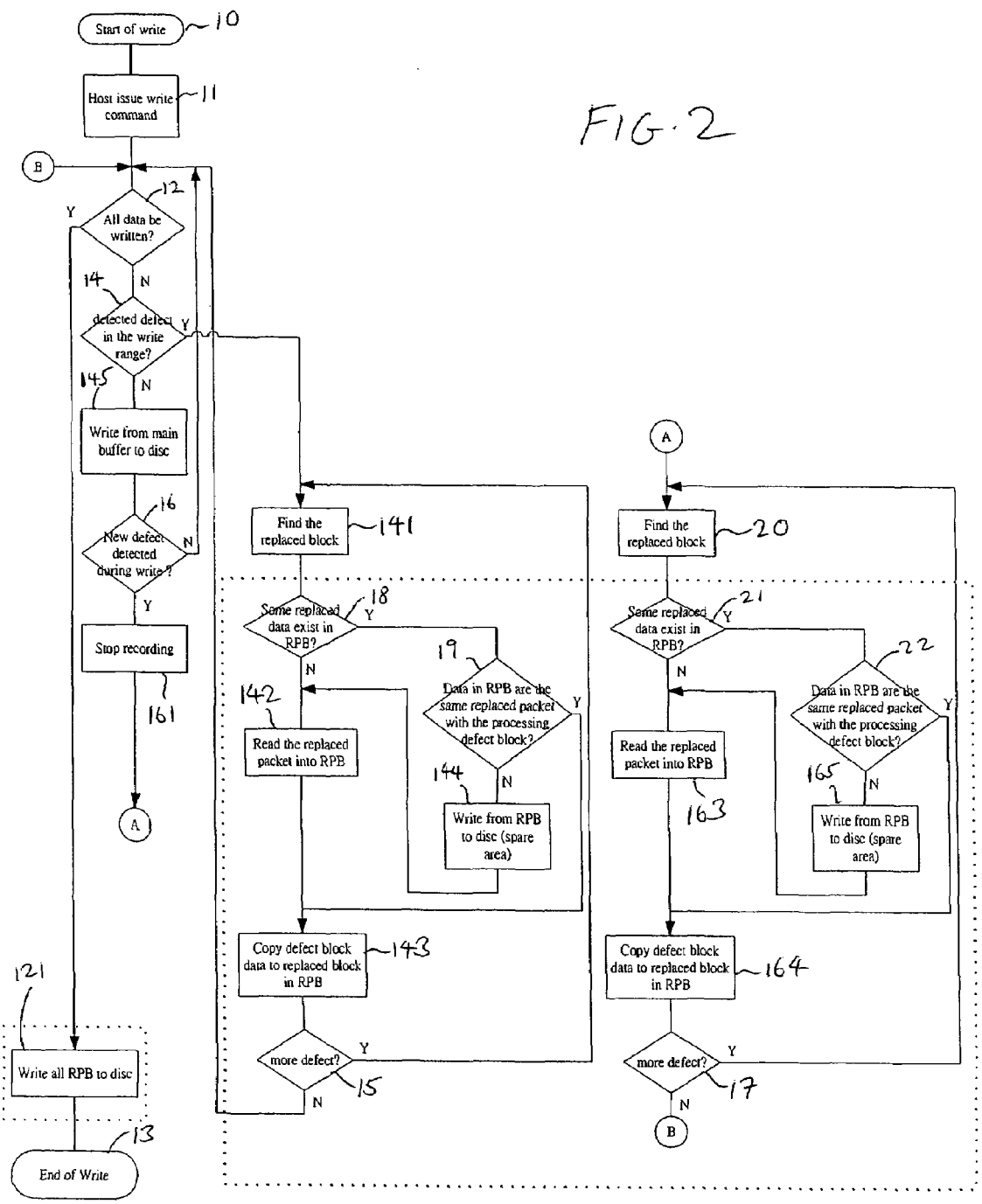
FIG. 2 is a flow chart illustrating a Mt. Rainier method according to the present invention of writing data to a recording disk which has defects.
Figure 3:
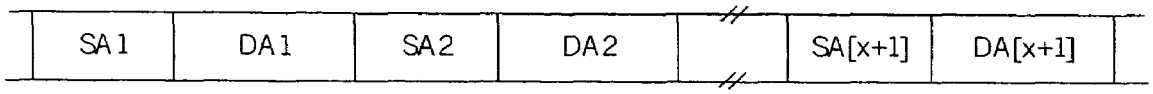
FIG. 3 illustrates how the storage space on a conventional CD-MRW is organized.
Figure 4:
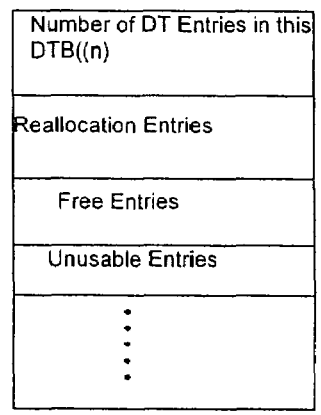
FIG. 4 illustrates a conventional defect table of CD-MRW.

FIG. 2 is a flow chart of a method according to the present invention for reducing the number of read and write operations performed on a recording disk during Mt. Rainier defect processing.

In Step 10, the write operation begins.

In Step 11, a write command is issued by the host (i.e., the host issues the write command to the CD-RW unit) directing the optical disk drive to receive data that comes from the host and to write the data to the recording disk.

In Step 12, it is determined whether all the data has been written to the recording disk. If all the data has been written to the recording disk, processing then proceeds to Step 121 in which all the data in the replacement packet buffer (RPB) are written to the spare blocks SA on the recording disk, and then on to Step 13 to conclude the write operation. If all the data has not been completely written to the recording disk, processing then proceeds to Step 14.

In Step 14, it is determined whether any defects are detected in the section where data is to be written. If there is a defect detected in the section where data is to be written, processing then proceeds to Step 141 and the block to be replaced is searched for. If there are no defects detected in the section where data is to be written, processing then proceeds to Step 145.

In Step 141, the block that is to be replaced is searched for. This step is similar to Step 141*a* described above. Next, in Step 18, it is determined whether there is previous replaced data that is currently being stored in the RPB. If there is replaced data in the RPB, processing then proceeds to Step 19. In Step 19, it is determined whether the previous replaced data in a particular location of the RPB is the same as the packet of the replacement block that is currently being processed. Here, we can consider a first packet A to be the previous replaced data that is stored in the RPB, and a second packet B to be the replacement block that is currently being processed. If the packet is determined to be the same in Step 19 (i.e., packet A=packet B), it is considered to be a cache hit and processing proceeds directly to Step 143, thereby omitting the "read" step 142. However, if the packets are different (i.e., packet A is not equal to packet B), it is considered to be a cache miss and processing proceeds to Step 144. For a cache miss, in Step 144, the previous replaced data in the RPB (i.e., packet A) is written to the corresponding spare block SA in the recording disk, after which processing proceeds to Step 142. This is the "write" step that is similar to step 144*a* and 165*a* described above. It should be noted if there is no previous replaced data in the RPB in step 18, processing will proceed to Step 142 as well.

In Step 142, the entire packet where the replacement block is located (i.e. packet B) is read from the recording disk into the replacement packet buffer (RPB), which is in the RAM of the optical disk drive, and processing then proceeds to Step 143. Thus, step 142 is the "read" step that is similar to step 142*a* and 163*a* described above.

In Step 143, the defective block data is copied from the main buffer (which is also in the RAM in the optical disk drive) into the corresponding replacement block in the RPB, and processing then proceeds to Step 15. Thus, step 143 is the "modify" step that is similar to step 143*a* and 164*a* described above.

In Step 15, it is determined whether there are more defects in the section where data is to be written. If there are more defects, processing then returns to Step 141, and Steps 141, 18, 19, 142, 143, 144 and 15 are repeated until there are no more defects in the section where data is to be written. When there are no other defects in the section where data is to be written, processing then returns to Step 12.

In Step 145, the contents of the main buffer are written directly to the recording disk. Processing then proceeds to Step 16.

In Step 16, it is determined whether there are new defects detected during the write operation. If no new defects are detected, processing then returns to Step 12. However, new defects may occur on a recording disk even after it has been formatted (such as from scratches during use by the user). If any such new defects are detected, then processing proceeds to step 161 and the write operation is terminated. Processing next proceeds to Step 20.

In Step 20, the block that is to be replaced is searched for, and processing then proceeds to Step 21.

In Step 21, it is determined whether there is previous replaced data in the RPB. This is similar to step 18. If there is previous replaced data in the RPB, processing then proceeds to Step 22. In Step 22, it is determined whether the previous replaced data in a particular location of the RPB is the same as the packet of the replacement block that is currently being processed. If the packet is determined to be the same in Step 22, it is considered to be a cache hit and processing proceeds to Step 164, but if the packet is different, it is considered to be a cache miss and processing proceeds to Step 165.

For a cache miss, in Step 165, the data in the RPB is written to the corresponding spare block SA in the recording disk, after which processing proceeds to Step 163. It should be noted if there is no previous replaced data in the RPB in step 21, processing will proceed to Step 163 as well.

In Step 163, the entire packet where the replacement block is located is read from the recording disk into the replacement packet buffer (RPB), which is in the RAM of the optical disk drive, and processing then proceeds to Step 164.

In Step 164, the defective block data is copied from the main buffer (which is also in the RAM in the optical disk drive) into the corresponding replacement block in the RPB, and processing then proceeds to Step 17.

Thus, steps 21, 22, 165, 163 and 164 are similar to steps 18, 19, 144, 142 and 143, respectively.

In Step 17, it is determined whether there are more defects in the section where data is to be written. If there are more defects, processing then returns to Step 20, and Steps 20, 21, 22, 163, 164, 165 and 17 are repeated until there are no more defects in the written-in section. When there are no other defects in the written-in section, processing then returns to Step 12.

In summary, the present invention detects the existence of a cache hit situation which would allow the process to omit the read and write steps, thereby reducing the number of read and write operations during a Mt. Ranier procedure. Specifically, if the corresponding packet where the replacement block of a defective block that is being processed already exists in the RPB (i.e., a cache hit), it no longer becomes necessary to read from the recording disk into the RPB (i.e., steps 142 and 163 can be omitted), but rather the copy operation (i.e., steps 143 and 164) can be carried out. Also, after the copy operation has been completed, it is also no longer necessary to immediately write (i.e., steps 144 and 165) to the recording disk. As a result, the number of read and write operations performed on the recording disk can be reduced, thereby improving the control efficiency of the recording disk. This is particularly true because the probability of a cache hit is quite high due to the arrangement of the defective blocks and the replacement blocks.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for reducing the number of operations performed on a recording disk during Mt. Rainier defect processing, comprising:
    a. writing data from a host to a recording disk;
    b. if there are defects in a section where data is to be written, searching for a replacement block for the currently-processed defective block;
    c. if there is previous replaced data currently stored in the replacement packet buffer (RPB), and if the packet in the RPB is not the same as the packet for the replacement block, then:
        c1. writing the RPB data to a corresponding spare block in the recording disk;
        c2. reading the replacement block into the RPB;
        c3. copying the data in the currently-processed defective block into the corresponding replacement block in the RPB; and
    d. if there is previous replaced data currently stored in the RPB, and if the packet in the RPB is the same as the packet for the replacement block, then performing step c3 while omitting steps c1 and c2.

2. The method of claim 1, further including:
    writing RPB data to spare blocks on the recording disk if all the data has been written to the recording disk and there are no further defects in the section where data is to be written.

3. The method of claim 1, further including:
    e. if there are further defects in the section where data is to be written, repeating steps c, c1, c2, c3 and d.

4. A method for reducing the number of operations performed on a recording disk during Mt. Rainier defect processing, comprising:
    a. writing data from a host to a recording disk;
    b. if there are defects in the section where data is to be written, searching for a replacement block for the currently-processed defective block;
    c. if there is previous replaced data currently stored in the replacement packet buffer (RPB), and if the packet in the RPB is the same as the packet for the replacement block, then only copying the data in the currently-processed defective block into the corresponding replacement block in the RPB without any reading operations.

5. The method of claim 4, further including:
    writing RPB data to spare blocks on the recording disk if all the data has been written to the recording disk and there are no further defects in the section where data is to be written.

6. The method of claim 4, further including:
    d. if there is previous replaced data stored in the RPB, and if the packet in the RPB is not the same as the packet for the replacement block, then:
        d1. writing the RPB data to a corresponding spare block in the recording disk;
        d2. reading the replacement block into the RPB;
        d3. copying the data in the currently-processed defective block into the corresponding replacement block in the RPB.

* * * * *